United States Patent [19]

Bottorf et al.

[11] Patent Number: 5,072,409

[45] **Date of Patent: * Dec. 10, 1991**

[54] GRAPHIC DISPLAY WITH RIGHT-PROTECTED AREAS

[75] Inventors: Scott A. Bottorf, Cedar Rapids; James R. Robb, Marion, both of Iowa

[73] Assignee: Rockwell International Corporation, El Segundo, Calif.

[ * ] Notice: The portion of the term of this patent subsequent to Jul. 10, 2005 has been disclaimed.

[21] Appl. No.: 845,218

[22] Filed: Mar. 27, 1986

[51] Int. Cl.[5] .............................................. G06F 15/20

[52] U.S. Cl. ...................................................... 395/137

[58] Field of Search ................................ 364/518, 521; 382/44–48; 340/721, 723

[56] References Cited

U.S. PATENT DOCUMENTS

| | | | |
|---|---|---|---|
| 4,204,206 | 5/1980 | Backula et al. | 340/799 X |
| 4,570,181 | 2/1986 | Yamamura | 382/48 X |
| 4,811,241 | 3/1989 | Liang | 364/518 |

*Primary Examiner*—Heather R. Herndon

*Attorney, Agent, or Firm*—George A. Montanye; M. Lee Murrah; H. Fredrick Hamann

[57] ABSTRACT

The speed at which a display screen is updated is increased by updating only those areas of the screen that have changed since the last update. This is accomplished by dividing the screen display elements into a grid of contiguous areas, and defining those areas which changing video information as unprotected areas and other areas as protected areas. As new images are generated, the memory containing information displayed in the protected areas is protected from updating while that in the unprotected area is not protected.

10 Claims, 3 Drawing Sheets

GRAPHIC DISPLAY WITH RIGHT-PROTECTED AREAS

BACKGROUND OF THE INVENTION

The present invention relates to displays and more particularly to an apparatus and technique for protecting predefined display areas in a graphic video display.

In the prior art, video displays are used in a variety of applications to display image information in alphanumeric as well as graphic form. Television and similar cathode ray tube (CRT) type displays are only one example of the many applications which employ display techniques designed to display such information. Such displays rely on the well-known technique of raster scanning a CRT defined by rows and columns of phosphor pixels each of which is modulated by an electron beam to define the picture image. As is known, the raster scanning is accomplished by horizontally scanning each pixel with the electron beam as the beam is indexed vertically from one row to the next until all of the pixels defining the face (screen) of the CRT have been scanned. The scanning is at a repetition rate which has the effect of producing an image on the face of the CRT which changes with time in accordance with the information provided to the electron beam as it scans each pixel. The scanning may be accomplished using well-known interleave techniques which prevent flicker yet produce the same effect as if each line was scanned in sequence to address each of the pixels on the screen.

In employing the above known display techniques, raster scanning has been identified as one of the primary display techniques. Also known however, is the use of stroke writing on the same CRT display. Stroke writing is somewhat different in that it traces only the pixels forming an image by specifically controlling the deflection of the electron beam in accordance with the configuration of the image to be displayed. This is in contrast to the raster display wherein the electron beam scans all pixels horizontally and vertically in a predetermined fashion but modulates the beam at specific pixels during scanning to produce the desired image. In either of such well-known techniques, the configuration of the displayed image is produced by the storage of information which controls the modulation of the electron beam for each screen pixel during raster scan, or which controls the movement and modulation to produce stroke writing. In some cases, display techniques use a combination of raster scanning and stroke writing, wherein the stroke writing is performed during the vertical retrace between scans to produce the benefits of both raster and stroke writing in a display environment.

Although raster scanning and stroke writing techniques have been described above with respect to a CRT, similar techniques may be used in connection with other displays including LCD, TFEL, etc., wherein the scanning and energization of individual visual display elements of a given display produces the desired visual image for the particular type of technology employed. Examples of circuitry for controlling the scanning and display of information are well-known in each of those technologies and need not be described in great detail. However, regardless of the technology employed to provide the visual display, the images which are produced are the result of information storage of sufficient detail to provide actuation of display elements during each scan period so that the desired image may be produced and modified on a scan to scan basis to produce the display which the image represents. In all cases, such displays usually employ a significant amount of memory and control circuitry to provide the original and updated information for each screen scan to be sure that the image is reproduced accurately for visual display.

In many applications, particularly those in which a raster scanned CRT display may be employed, there are certain configurations of images which are repeatedly provided in connection with a display and particular areas that may be designated and protected for only writing such image information. By way of example, in many avionic systems there may be a need to continuously display a certain image representing fixed information which provides a visual display of certain flight data. In still other instances, it may be necessary to provide a fixed background of information which is used in conjunction with certain stroke-written information in other areas of the display such that the stroke-written information may be continually updated while the fixed images are employed. In these cases, the fixed images remain the same for each raster scan of the CRT screen and the only information that changes is that which is being updated by stroke-writing in other areas of the screen. As a result, the screen may be viewed as an image area divided into portions in which no image is written and portions in which writing of information will occur.

In still other instances, it may be desirable to provide an area in which no information is written at all, such that that area of the particular display screen can be protected from writing regardless of the information that may be in the writing control memory. In implementing such systems using conventional technology, large amounts of memory are required to initially store, update and transfer to a writing control, the information necessary to maintain the fixed images and protected areas desired in a given display situation. As a result, there is a continuing need for developing systems and techniques which reduce the memory, complexity, and speed of operation, yet still provide an ability to maintain fixed images and protected areas in a visual display system.

Accordingly, the present invention has been developed to overcome the specific shortcomings of the above known and similar techniques and to provide a video system which allows more simplified control of fixed image generation and display protection.

SUMMARY OF THE INVENTION

In accordance with the present invention, a display protection system and technique is disclosed which allows the generation of information which rapidly defines the protected positions for each scan of a video screen. The protection technique is designed to divide a video screen into a plurality of blocks wherein the blocks contain all of the information necessary to control and define the video image. The blocks can be divided into groups in which image information will be written, blocks in which image information will not be written, and blocks defining boundaries of image information. The blocks falling completely inside and completely outside the image area are considered to be inactive blocks, while the blocks which include an image boundary are considered active blocks. Active blocks are further divided and defined to control individual display elements falling inside and outside of the image area to completely define an image.

In one particular embodiment of the invention, there is disclosed an exemplary system which allows the storage and generation of sixteen different images. Each of the sixteen individual images is identified as a window and each window is divided into a square grid of 4096 blocks defined by a 64 row by 64 column array. Each of the 4096 blocks defining the grid may be further defined by a 32 row by 32 column pixel array. The resulting grid of 2048 rows by 2048 columns of pixels defines the image area forming the CRT display screen.

In defining the image area to be displayed, a first memory stores (for each of the predefined windows representing a graphic image) information identifying each of the 4096 blocks as an active or inactive block For each inactive block, the stored information identifies the block as being inside or outside of the image area. For each active block, the stored information references a second memory which contains the information for each of the 32×32 pixels representing the boundary block. Thus, for each pixel address for a given screen scan, the first memory provides an immediate indication of the pixel address falling within an active or inactive block and the second memory resolves the position of the pixel as falling within or outside of the image area. In this manner, the two memories store a plurality of fixed images which may be selected so that each pixel address of a video display can be identified as being within or outside of an image area during repetitive scans of the CRT screen. This may be accomplished without the need for the complex storage, update and transfer circuitry as is normally required in a typical raster control.

It is therefore a feature of the invention to provide an improved video display system and technique for facilitating the display of predefined images.

It is another feature of the invention to provide a system and technique for dividing a display area into protected and non-protected areas for providing image generation.

Yet another feature of the invention is to provide a video display system and technique which allows the storage and generation of multiple predetermined images by dividing the screen into a plurality of protected and non-protected display areas.

Still a further feature of the invention is to provide a video display protection technique which may be employed to protect image areas in a video display in various technologies.

Still another feature of the invention is to provide a dual memory system which defines protected and non-protected areas of a display and stores the information for each display element for repetitive use depending upon its applicability to multiple images.

Yet a still further feature of the invention is to provide a video display protection technique which allows various images to be generated and protected in a raster scanned CRT display with less memory and control circuitry and faster response than conventional techniques.

These and other advantages and novel features of the invention will become apparent from the following detailed description when considered in connection with the accompanying drawings wherein:

DETAILED DESCRIPTION OF A PREFERRED EMBODIMENT

Figure 1:
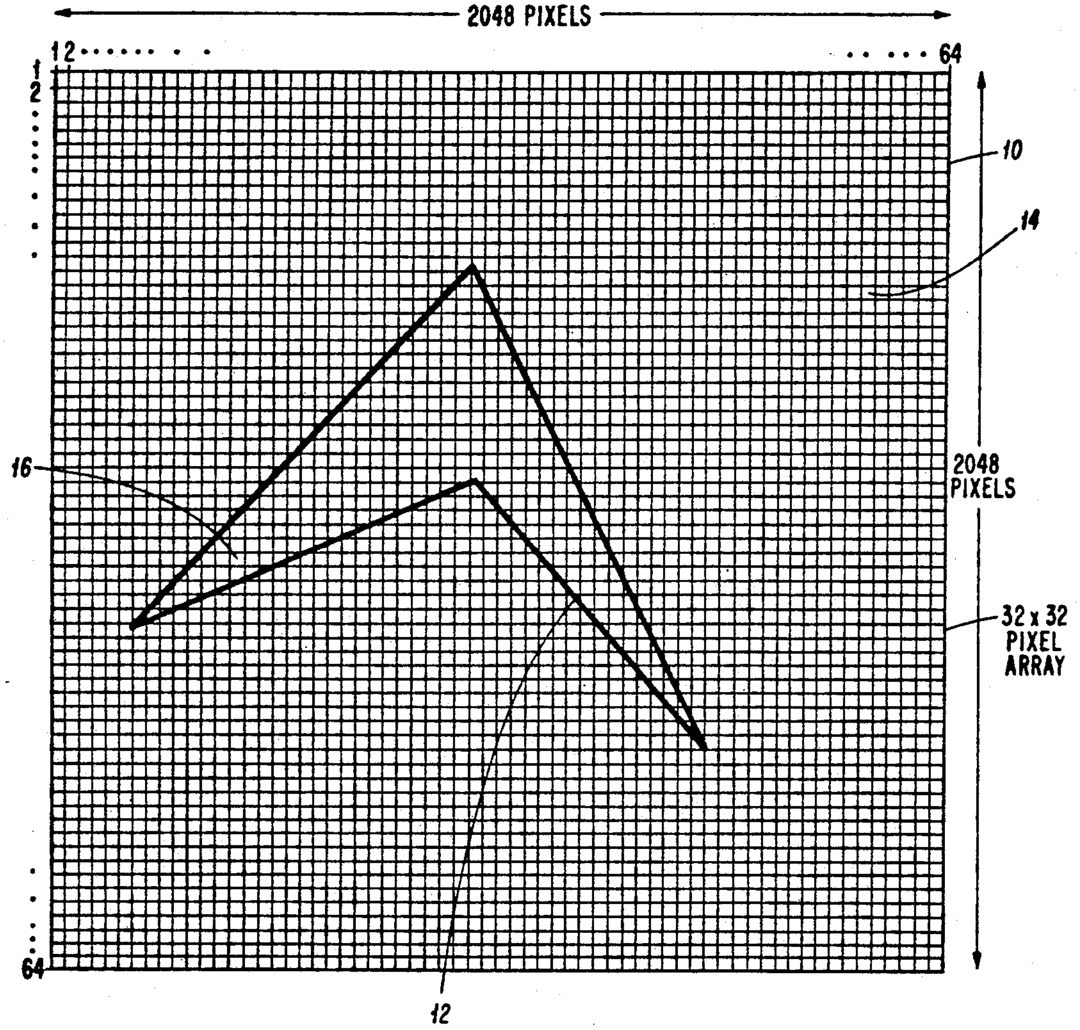
FIG. 1 is a schematic diagram showing the division of a video screen into a 64×64 block screen grid representing the visual display area.

Referring now to the drawings, wherein like numerals are used to refer to like elements throughout, there is disclosed a video protection and display system and technique for generating various images in a video display system. In order to simplify the understanding and operation of the system, the same will be described with respect to a raster-scanned CRT display having a display screen represented by a square grid of 2048 pixel rows by 2048 pixel columns. It should be understood, however, that the same is for purposes of illustration only, and the system and technique is equally applicable to other than raster-scanned CRTs and other than the number of display elements (pixels) described.

Referring first to FIG. 1, there is shown a grid 10 which represents the display face of a CRT and which is divided into a square grid of 64 rows by 64 columns of blocks to define an array of 4096 blocks. For purposes of illustration, each of the blocks 64 can be further divided into a square grid of 32 pixel rows by 32 pixel columns so that the total number of pixels forming the image area represented by the CRT display screen may be considered as a square grid formed by 2048 rows of pixels and 2048 columns of pixels. Thus, the total display area is defined by a square grid 2048 pixels wide by 2048 pixels high and which is divided into a square grid 64 blocks wide by 64 blocks high.

As is known, in order to define an image or display, each of the individual pixels containing information to be displayed may be energized. Thus, for each scan of a CRT in a conventional system, if an image 12 is to be displayed, there must be a storage area which stores all of the information necessary to control the electron beam for each of the 2048 by 2048 pixels so that the image 12 can be generated. As will be appreciated, this information must be stored for each image to be generated and must be updated for writing the display screen for each scan of the CRT. It will be apparent that such volume of storage and update between scans increases the complexity of the display system and increases the access time and write time for generating a given display.

In accordance with the present invention, in order to generate the image 12 as shown in FIG. 1 or one of sixteen other images in the present example of the protection system, each of the 64×64 blocks of the square grid shown in FIG. 1 may be identified as an active or inactive block. The term inactive is used to define a block falling either totally outside the image area 12 in the area 14 or totally inside the image area 12 in the area 16. Any of the 64×64 blocks which forms a boundary of the image area 12 is identified as an active block as will be described in more detail below.

In the present example using a 2048 pixel by 2048 pixel array, each pixel has a unique 11-bit X, Y address which defines the particular display element (pixel) that is being addressed during the raster scanning of the CRT screen. For each of the inactive blocks, that address can be identified as falling outside or inside of the image area when that pixel falls totally within one of the inactive blocks. However, when the X, Y address defines a pixel within one of the active blocks containing a boundary of the image 12, there is a need for further resolution to determine the specific position of the pixel with respect to it being inside or outside of the image area 12. Accordingly, the present invention employs a two memory system which enables an initial determination in the first memory that a pixel falls within an active or inactive block, and a second determination in the second memory that resolves the position of the individual pixels to identify their location as inside or outside of the boundary of the image area 12.

Figure 2:
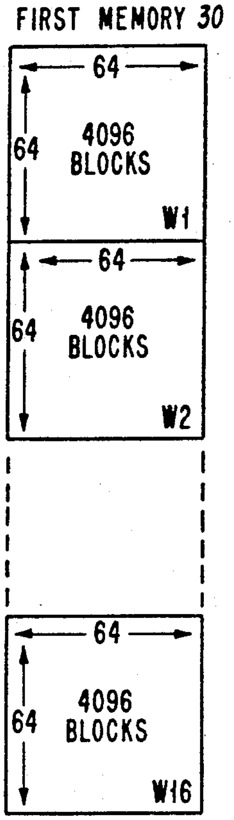
FIG. 2 is a schematic diagram representing the first memory storage of 16 windows (images) to be used in a video system wherein each window represents an image configuration to be imposed upon the 64×64 block screen.
Figure 3:
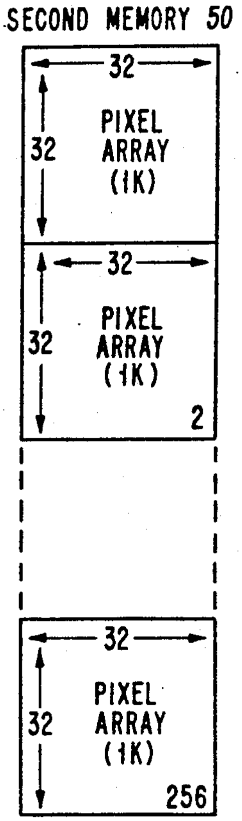
FIG. 3 is a schematic illustration of the contents of the second memory of 256 blocks of information which each individually represent a 32×32 pixel array forming a given block of information.

Referring now to FIG. 2, there is shown a schematic representation of a plurality of stored windows W1–W16 which represent the number of different images that may be generated on the screen 10. By way of example, the first window W1 may include the image 12 and the 2and through 16the windows (W1–W16) may define other image configurations, each of which may be selected to be displayed on the face of the CRT. For each of the windows W2–W16, a 64×64 block grid is defined to produce a total of 4096 blocks representing the active and inactive blocks of the screen 10. In order to store this information, a first memory 30 (FIG. 4) is employed which receives information defining each of the 4096 blocks for each of the sixteen windows W1–W16, or a total of 64K blocks (4096×16). Thus, as shown in FIG. 2, there are stored 4096 blocks of information for each window W1–W16 representing a particular image to be displayed for each of sixteen separate images for a total of 64K blocks of information.

In order to resolve the blocks of each window to identify those active and inactive blocks and to further enable the decoding of each active block so that each pixel within an image area can be identified, a 12-bit binary entry is initially entered at 31 (in a conventional manner for RAM loading) for each storage location representing a block in the memory 30. As a result, each of the 64K blocks has an associated 12-bit entry which uniquely identifies each of the 4096 blocks for each of the sixteen windows W1–W16. The 12-bit entry at each storage location comprises a 2-bit inside/outside field, a 2-bit symmetry control field and an 8-bit active pointer field. The first two bits comprise the inside/outside polarity control which identify a block as being inside or outside the protected area. The next two bits are, respectively, an X symmetry control and Y symmetry control for enabling the reversal of the pixel addressing as will be described in more detail below. The remaining bits constitute an 8-bit pointer code which enables the access of a second memory 50 which stores the details of each active block to fully define the pixel information for each pixel addressed during a raster scan. The pixel information is entered at 49 and stored as a plurality of blocks of 32 rows ×32 column pixel arrays (1K storage), so that for each active block, each of the pixels defining that block can be defined by a specific pixel array in the second memory 50.

As constructed in the present example, the second memory 50 is constructed as a 64K ×4 RAM and may include a total of 256 unique active blocks representing a 32×32 pixel array (1K bits) for a total of 256K storage locations, each representing a pixel. The information for each pixel in each of the 256 active blocks is entered in a conventional manner through 49 into the 64K ×4 RAM. For each addressed pixel which falls within an active block as determined by the 12-bit entry code in the first memory 30, an 8-bit pointer (represented by the outputs D0–D7 of memory 30) is provided to select the particular active block pattern (32×32 pixel array) in second memory 50 to decode the specific pixel address. Thus, 8-bit the printer to the particular active block and the 5 LSB X bits and 5 LSB Y bits of the pixel inside or outside the protected area. For any pixels falling within an active address are used to identify the pixel within the selected block in memory 50 to enable the output from memory 50 of the proper pixel information identifying the pixel as inside or outside of a protected area.

Figure 4:
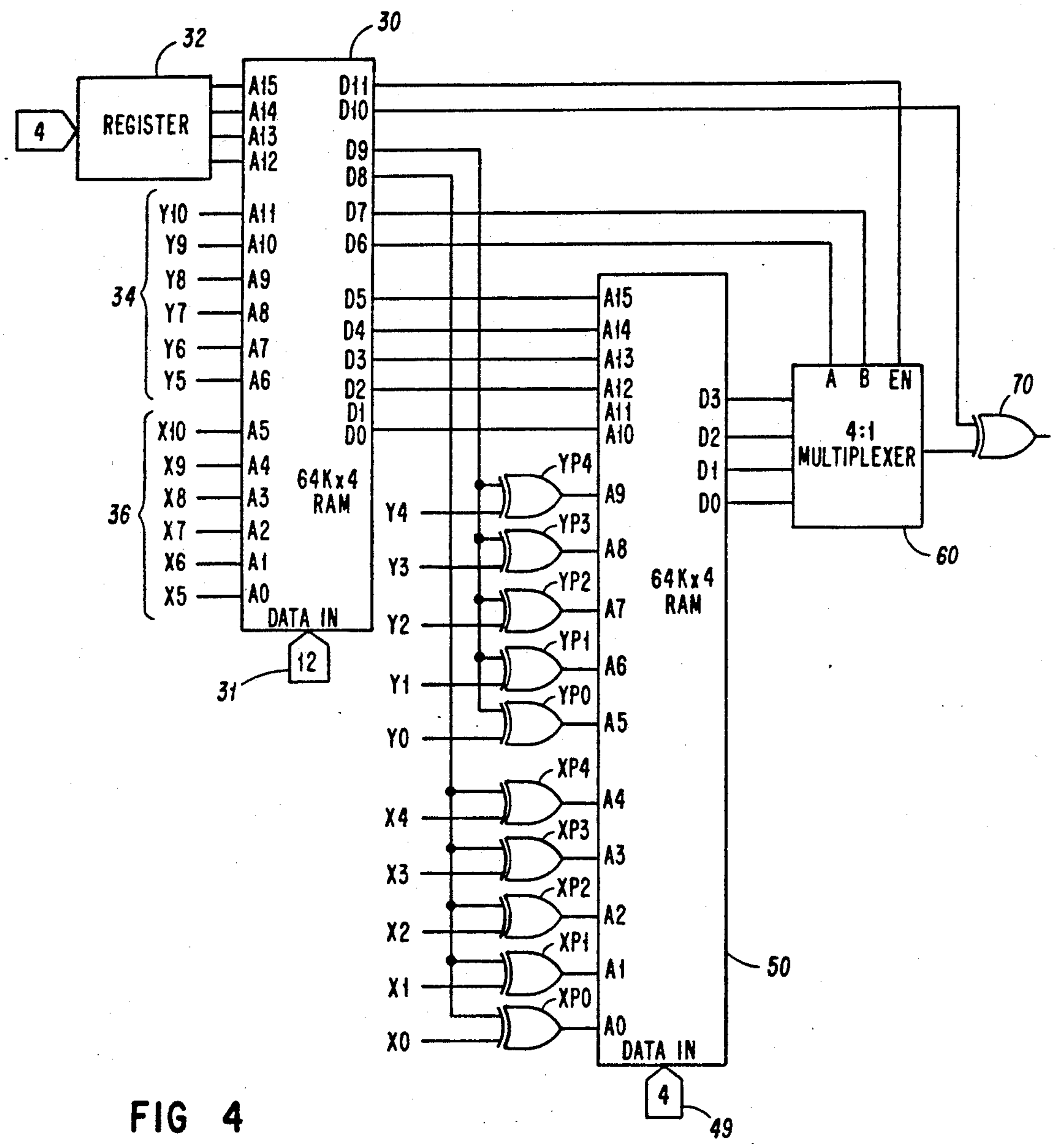
FIG. 4 is a schematic representation of a digital system capable of storing the information needed to define each display element (pixel) as a protected or unprotected element to enable the generation of a predetermined image from one sixteen windows.

Referring more specifically to FIG. 4, a 12-bit entry in each of the storage locations of first memory 30 is provided as output for each of the address blocks represented by the 6 MSBs of the X and Y pixel address entered at inputs A0–A5 for the X pixel address, and A6–A11 for the Y pixel address. The 12-bit entry code includes the 2-bit field identifying the selected block as inside or outside of the protected area!at outputs D10, D11, the 2-bit field representing X and Y symmetry at outputs D9 and D8, and the 8-bit pointer field represented by outputs D0–D7 for selecting the particular pattern block for decoding each pixel in the second memory 50. In this instance, the memory 50 is constructed as a 64K ×4 RAM because such memory devices are commercially built. As a result, the D7 and D6 outputs of the 8-bit pointer are coupled to the A and B inputs of a 4:1 multiplexer 60 to enable the generation of a control for providing one output from the multiplexer 60 upon the receipt of four inputs, generally shown as outputs D0–D3 of memory 50. Thus, for each active block identified upon the selection of a specific pixel address in first memory 30, that active block is identified as a specific 32×32 pixel array in memory 50 that normally provides four outputs at a given time through outputs D0–D3. The 2-bit D6 and D7 outputs from memory 30 decodes those four outputs (D0–D3) from memory 50 so that only one output appears from the multiplexer 60 and that output identifies the particular pixel decoded by the 5 LSBs of the X and Y pixel address appearing at memory 50 inputs A0–A4 and A5–A9, respectively.

In the embodiment shown in FIG. 4, the 1-bit entry from D11 identifies a block as active or inactive. When a block is inactive, the output from D11 coupled to the enable input of multiplexer 60 causes a logic low output to the exclusive-OR gate 70. When a block is active, the D11 output allows the multiplexer 60 to select one of the outputs D0–D3 from memory 50 as the multiplexer output to 70 in accordance with the control bits from D6 and D7 of memory 30.

Figure 5A:
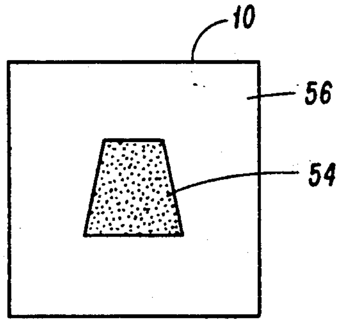
FIG. 5(*a*)–(*b*) are schematic representations depicting the complementary nature of a display image as defined by protected and non-protected areas.
Figure 5B:
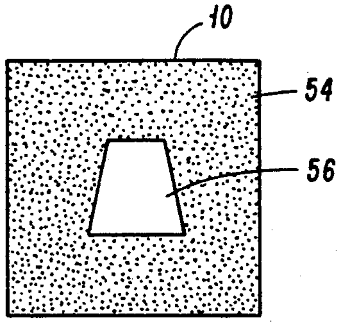

The D10 output is a polarity control which determines the position of the addressed pixel as inside or outside of the protected area. When a block is active, the D10 output identifies where writing will be enabled (e.g., inside or outside of the image area). When a block is inactive, the D10 output determines whether writing will be enabled or not enabled for that block to define the protected vs. non-protected area. The use of bit D10 as a polarity control for active blocks is shown in the example of FIG. 5 where writing is enabled at 54 inside the image area in FIG. 5*a* and at 56 outside the image area in FIG. 5*b* depending upon the bit stored and provided as output at D10.

Also shown in FIG. 4 are the two X and Y symmetry bits provided as output from memory 30. The output from D8 representing the X symmetry bit is coupled to the second input of exclusive-OR gates XP0–XP4, each of which is coupled to receive one of the X LSBs, X0–X4, respectively. In the same manner, the output from D9 of memory 30 is coupled as a second input to each of the exclusive-OR gates YP0–YP4, each of which has an input from one of the LSBs of the Y pixel address Y0–Y4, respectively. The outputs from XP0–XP4 are coupled to the inputs A0–A4 of memory 50 and the outputs of YP0–YP4 are coupled to the inputs A5–A9 of the memory 50 to address each of the pixels in the selected active block as identified by the pointer inputs DO D7.

Referring again to FIG. 4, the operation of the system will now be described in decoding each pixel address to determine whether the pixel falls within or outside of a protected area. In the present example, since the system is designed to store a total of sixteen image patterns W1–W16 (windows), a 4-bit code is necessary to identify those sixteen patterns as known in the art. Thus, using a 4-bit register 32 coupled to receive a 4-bit entry representing the selection of one of the sixteen windows W1–W16, the output from 32 selects (by the code input to A12–A15 of memory 30) one of the sixteen windows W1–W16 stored in the memory 30, to therefore define the particular 64×64 block grid to be generated by the display. Upon entry of a particular pixel address during the scan of the CRT, the MSBs (X5–X10) of the X pixel address (entered at the A0–A5 inputs 30) and the six MSBs (Y5–Y10) of the Y pixel address (entered at the A6–A11 inputs of memory 30) identify the particular block of the 4096 blocks of the selected window in which the addressed pixel falls If the particular pixel address selected falls inside the protected area 12, that indication is provided by the D10 bit output of the 12-bit entry code stored in that position of the RAM 30 corresponding to the block in which the pixel falls. The same indication occurs when the pixel falls in a block which is outside of the protected area by the representation on line D11. Thus, when a pixel falls inside or outside the protected area as represented by the bits D10 and D11 of the 12-bit entry made in each of the 4096 blocks for a selected window W1–W16, there is an immediate determination of the block (and therefore the addressed pixel) as being inside the protected area or outside of the protected area by the first two bits of the 12-bit entry in the RAM 30 corresponding to that block. When the block in which the addressed pixel falls contains a boundary of the image area, the 8-bit pointer from outputs D0–D7 of the 12-bit entry, identifies the block as an active block and provides that 8-bit output to further resolve the pixel information in the second memory 50 the pointer selection of an active block from one of the 256 unique patterns stored in memory 50.

Using the above first memory 30, for each pixel address falling within an inside or outside block, the first memory is sufficient to provide an output from 70 which controls writing of the display by identifying the pixel as inside or outside the protected area. For any pixels falling within an active block, however, the second memory 50 is needed to properly control the display More particularly, when an active block is identified and a pixel address falls within that active block, the particular configuration of the 32×32 pixel array for that unique block must be identified. Accordingly, the bit for that pixel stored in the second memory 50 is used to control the display for each pixel within an active block and the active block configuration for that pixel determined by the 8-bit pointer. The pointers loaded as the 8-bit code in the 12-bit entry of the first memory 30 select the unique block pattern stored in memory 50 upon a determination of the selected pixel falling within an active block. Thereafter, the five LSBs X0–X4) of the X address of the pixel and the five LSBs (Y0–Y4) of the Y address of the pixel are coupled to resolve the particular pixel within the active block selected by the 8-bit pointer code to identify that pixel as inside or outside of the protected area through the output of multiplexer 60.

As will be appreciated, since the pointer defines the particular active block stored in memory 50 in which the pixel address will be located for each of the sixteen windows, a total of 256 unique block patterns may be stored in the second memory. Each of the block patterns may be used by more than one window and may be used multiple times within a window since the pointer can address any unique block pattern in the second window of the 256 unique block patterns defined by the second memory 50.

As was previously noted, the present example uses a 64K×4 RAM memory to provide sufficient storage locations to define 256 unique 32×32 pixel arrays. However, the selection of the 64K by 4 RAM is only made due to commercial considerations in the purchase of the RAM, and could just as well be a 256K×1 memory, if such memory was constructed. instance, since the 64K×4 RAM is used, the 4×1 multiflexer 60 must be employed to isolate the particular output D0–D3 that represents the pixel which is being addressed at that time. Thus, the outputs D6 and D7 of the first memory 30 are employed to select which of the four bits is provided as the output of the multiplexer 60. The 4:1 multiplexer is only used because of the need to select one of the four bits for each pixel address, and obviously would not be necessary if the memory were 256K×1 instead of the 64K×4. However, if the 256K×1 RAM is used, the output of the memory 50 must be qualified by output D11 of memory 30 to select between active and inactive blocks. The net result of the 8-bit pointer output is to select the appropriate block and pixel from RAM 50 to provide the 1-bit representation for each pixel address necessary to define the pixel as inside or outside of the image area for an active block.

As was previously mentioned, for each one of the 256 unique blocks which define the contents of the 32×32 pixel array forming each of those 256 blocks, a given block (pixels) pattern may be used by more than one window, and multiple times within a given window. Thus, the 8-bit pointer entry provides the necessary direction to the second memory 50 to select the appropriate information (pattern) representing a particular active block and thus allows the detailed definition and resolution of each of the pixels by reference to the second memory 50. As will be appreciated, therefore, there is no need to store each of the 32×32 pixel arrays for each of the 4096 blocks for a given window W1–W16, since only active blocks need be defined in the second memory 50 and those blocks may be used in more than one instance for a given window or any number of windows. As a result, the storage capacity for defining an image pattern or protected area on a screen is reduced, with a substantial increase in speed in defining the protected vs. non-protected area.

Figure 6A:
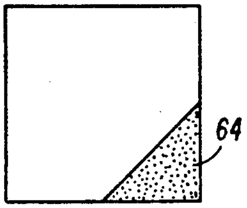
FIG. 6(*a*)–(*b*) are schematic representations showing the symmetrical nature of the active blocks in defining a protection area.
Figure 6B:
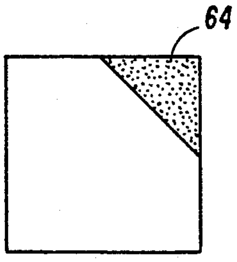
Figure 6C:
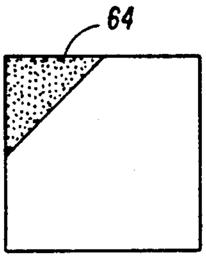
Figure 6D:
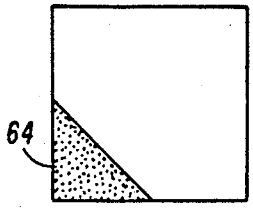

To further enhance the usefulness of the technique defining a pattern block stored in second memory 50, symmetry control bits from D8 and D9 are coupled through the exclusive-OR-gates which address the individual pixels for a given active block. The symmetry bits allow the orientation of a pattern stored in any of the blocks of memory 50 to be rotated or realigned in a different but symmetrical position with respect to its originally stored orientation. For example, a pattern stored to represent an image 64 in FIG. 6*a*, can be used to provide an output representing rotated and flipped versions of the same image as represented in FIGS. 6*b*–6*c* by merely changing the X, Y symmetry bits in the stored location of memory 30. This eliminates the need for, in this example, three additional pattern blocks to achieve the total of four different patterns represented by FIGS. 6*a*–6*c*. This is only one example of the ability to change the configuration of a window without the need to modify or generate different windows or pattern blocks to achieve that result and is only one example of the many types of symmetrical representations that may be employed to achieve similar results.

Utilizing the symmetry of a given pattern block stored in memory 50 in any given instance, and its placement with respect to a particular address and image to be formed, the complements of the X and Y address and the symmetry may be used to reduce the number of pattern blocks necessary to define a particular image configuration. Thus, the effectiveness of the number of pattern blocks stored in memory 50 may be increased by allowing the 8-bit pointer reference to select the appropriate pattern block and depending upon the symmetry through the X and Y symmetry bits of D8 and D9 involved, reuse that pattern block in other instances for different portions of other boundary definitions.

Referring again to FIG. 4, the operation will be again briefly described with respect to a selected pattern to be generated and protected on a given screen. Initially, a plurality of pattern blocks are stored in second memory 50 wherein each of the pattern blocks contain information for each of the pixel addresses within a 32×32 pixel array. Up to 256 pattern blocks may be stored for the purpose of providing the pixel information necessary for indicating a protected or non-protected area on the boundary of an active block. At the same time, for each of sixteen different windows defining a different image to be protected or displayed by the system, there is stored in memory 30 a 12-bit entry corresponding to of the 4096 blocks of each of the sixteen windows. The 12-bit entry includes two bits representing inside/outside designation, two bits representing symmetry, and an 8-bit pointer, two of which are used to control the 4:1 multiplexer, and six of which are used specify the particular pattern block to be addressed in the second memory 50.

Thereafter, during operation of the system, the particular image to be displayed is selected by the 4-bit code entering register 32 which defines the selected window W1–W16. The logic output from 32 is provided to first memory 30 which selects the group of 4096 blocks which define that selected window. At the same time, the 6 MSB X-bits and 6 MSB Y-bits of the X, Y pixel address isolate each selected pixel during a raster scan is falling within one of the 4096 blocks. When that block is an inactive block the inside/outside bits D11–D10 of memory 30 provide an output to exclusive-OR gate 70 to designate a protected or non-protected area. When the selected pixel falls within an active block, the 5 LSB X bits and 5 LSB Y bits of the same pixel are used to address the particular pixel position in one of the 256 pattern blocks selected by the pointer address from the output of memory 30. As that particular pixel address is selected, the 8-bit pointer causes the output DO D7 of one bit from the multiplexer 60 through gate 70 to identify the pixel as being inside or outside of the protected area. The inside designation is coupled through the OR-gate such that the output of the exclusive-OR gate provides the sole indication of a pixel falling inside or outside of the image area.

In this manner, as each particular pixel is addressed during a raster scan the output from 70 provides the logic indication which designates the pixel as falling within or outside of an image area and whether that pixel is in a protected or non-protected area. As a result, the system may be used to easily implement raster scanning of a CRT to generate image areas defined by the protected windows W1–W16. This is particularly useful to identify those protected or image areas in a raster scanned CRT where the image areas are fixed from scan to scan in some applications and thereafter changed to a different image or protection area for other applications. This provides versatility for image generation in connection with CRT display and the concepts behind the generation of the pixel information can be applied to other displays having display elements similar to or corresponding to the pixels on a CRT.

As will be apparent form the above description. the techniques are applicable to other than the specific CRT displays and may be implemented in other memory and storage configurations designed to accomplish the pixel or display element isolation as required. The technique may be applied to provide a resolution at a level above the individual pixels (groups of pixels or display elements) and may be employed with conventional raster scanning and stroke-written systems to provide improved efficiency in generating image areas.

By way of further example, in a raster scan implementation only, the output signal from 70 may be used to protect against writing in certain areas by controlling the output from the electron beam during scanning, or may be used to control filling of the refresh memory which controls writing of the electron beam during scanning.

Obviously, there are many other variations and modifications of the invention which are possible in light of the above teachings. It is therefore to be understood that within the scope of the appended claims, the invention may be practiced otherwise than as specifically described

We claim:

1. In a video display apparatus for displaying graphic images, having a display screen including a multiplicity of energizable display elements arranged in an array and means for energizing selected ones of said display elements to form a graphic image, the improvement comprising:

means for defining a multiplicity of continuous display areas, each encompassing a portion of said display elements;

means for storing a multiplicity of graphic component patterns corresponding to the display areas;

means for identifying portions of said graphic component patterns that are protected from energization by the energizing means, the remaining portions being unprotected;

means for assembling selected ones of said graphic component patterns to form a window; and means for controlling energization of said display elements by said energizing means in accordance with the protected and unprotected areas in the window.

2. The improvement as described in claim 1 further including means operating upon said storing means for altering selected ones of said graphic component patterns.

3. The improvement as described in claim 1 wherein said altering comprises reversing said graphic patterns along a desired axis.

4. The improvement as described in claim 1 wherein said altering comprises inverting said graphic patterns.

5. The improvement as described in claim 1 wherein said multiplicity of continuous display areas comprises a grid of square areas.

6. The improvement as described in claim 1 wherein said multiplicity of contiguous display areas are sized to contain fever energizable display elements than the number of contiguous display areas.

7. The improvement described in claim 6 wherein said multiplicity of contiguous display areas are sized to contain a number of energizable display which is one-fourth the number of contiguous display areas.

8. In a video display apparatus for displaying graphic images, having a display screen including a multiplicity of energizable display elements arranged in an array, means for addressing the display elements and means for energizing selected display elements to form a graphic image, the improvement comprising:

means for defining a multiplicity of contiguous display areas on the display screen, each encompassing a portion of said display elements:

first means for storing a multiplicity of graphic component patterns dimensioned to correspond to the display areas;

means for identifying portions of said graphic component patterns that are protected from energization by the energizing means, the remaining portions being unprotected;

second means for storing information, corresponding to each of said display areas, pointing to desired ones of said graphics component patterns, the composite of said stored information comprising an assembled graphics image;

first means, responsive to the display element addressing means, for addressing the second storing means;

second means, responsive to the information in said second storing means, for addressing the first storing means; and means, responsive to the information in the first storing means, for controlling energization of said display elements by said energizing means in accordance with the graphics component pattern and the protected and unprotected areas in the window.

9. The improvement as described in claim 8 further including means for displaying changing images on said video display screen in said unprotected areas.

10. The improvement as described in claim 8 further including means responsive to said second storing means for altering said graphic component pattern stored in first storing means.

* * * * *